(12) United States Patent
Dureiko et al.

(10) Patent No.: US 7,707,782 B2
(45) Date of Patent: May 4, 2010

(54) ABSORBER TOWER METAL HOOD TO CONCRETE SHELL ATTACHMENT

(75) Inventors: Ronald Dureiko, Stow, OH (US); David Peterson, Uniontown, OH (US); Gary W. Diefendorff, Cuyahoga Falls, OH (US); Bruce P. Guilliams, Clinton, OH (US)

(73) Assignee: The Babcock & Wilcox Power Generation Group, Inc., Barberton, OH (US)

( * ) Notice: Subject to any disclaimer, the term of this patent is extended or adjusted under 35 U.S.C. 154(b) by 1394 days.

(21) Appl. No.: 11/055,760

(22) Filed: Feb. 10, 2005

(65) Prior Publication Data

US 2006/0185320 A1    Aug. 24, 2006

(51) Int. Cl.
E04D 13/00 (2006.01)
E04D 1/34 (2006.01)
B62D 63/04 (2006.01)

(52) U.S. Cl. .................. 52/25; 52/3; 52/4; 52/295; 52/573.1

(58) Field of Classification Search .............. 52/573.1, 52/295, 192, 3, 706–708, 92.1, 92.2, 4, 5, 52/23, 25, 83, 90.1, 712, 293.3; 403/408.1, 403/232.1
See application file for complete search history.

(56) References Cited

U.S. PATENT DOCUMENTS

| | | | | |
|---|---|---|---|---|
| 1,037,678 A * | 9/1912 | Snyder | .......................... | 52/706 |
| 1,617,555 A * | 2/1927 | Vallentin | ..................... | 52/249 |
| 1,840,741 A * | 1/1932 | Reid | .......................... | 248/678 |
| 1,972,885 A * | 9/1934 | Gleason et al. | ................ | 95/211 |
| 2,625,815 A * | 1/1953 | Black | ......................... | 52/126.1 |
| 2,765,135 A * | 10/1956 | Chellis | ........................ | 248/49 |
| 2,948,995 A * | 8/1960 | Cogan | ......................... | 52/259 |
| 3,319,391 A * | 5/1967 | Lutch | .......................... | 52/371 |
| 3,323,765 A * | 6/1967 | Fernandez | ................... | 52/295 |
| 3,561,307 A * | 2/1971 | Mortensen | ................... | 411/432 |
| 3,630,474 A * | 12/1971 | Minor | ......................... | 52/98 |
| 3,695,139 A * | 10/1972 | Howe | ......................... | 411/432 |
| 3,712,012 A * | 1/1973 | Meyer et al. | .................. | 52/249 |
| 3,722,159 A * | 3/1973 | Kessler | ........................ | 52/252 |
| 3,933,182 A * | 1/1976 | Costes | ........................ | 138/149 |
| 4,051,570 A * | 10/1977 | Hilfiker | ........................ | 14/26 |
| 4,179,151 A * | 12/1979 | Tye | .............................. | 294/89 |
| 4,296,576 A * | 10/1981 | Rice et al. | .................... | 52/92.2 |
| 4,318,254 A * | 3/1982 | Stegmeier | ................... | 52/169.7 |
| 4,327,532 A * | 5/1982 | Matthews | .................... | 52/92.2 |

(Continued)

FOREIGN PATENT DOCUMENTS

DE            3342731 A1 *    6/1985

(Continued)

*Primary Examiner*—Richard E Chilcot, Jr.
*Assistant Examiner*—Andrew J Triggs
(74) *Attorney, Agent, or Firm*—Michael J. Seymour; Eric Marich

(57) ABSTRACT

An assembly and method for facilitating the attachment of a metal alloy hood to the concrete shell of a spray absorber tower, and compensating for relative radial thermal expansion of the hood and the shell during start up, shut down, and operation of the spray absorber tower, while also providing accurate and effective distribution of shear forces circumferentially along a horizontal plane from the metal alloy hood to anchor rods partially embedded in the concrete shell of the spray absorber tower.

14 Claims, 3 Drawing Sheets

U.S. PATENT DOCUMENTS

| | | | | |
|---|---|---|---|---|
| 4,368,060 | A | * | 1/1983 | Yanagiako et al. ............ 95/226 |
| 4,548,003 | A | * | 10/1985 | Johansson et al. .............. 52/73 |
| 4,581,866 | A | * | 4/1986 | Malcolm-Brown ........... 52/232 |
| 5,197,255 | A | * | 3/1993 | Fricker ........................ 52/703 |
| 5,245,803 | A | * | 9/1993 | Haag ......................... 52/90.1 |
| 5,261,198 | A | * | 11/1993 | McMillan ................ 52/127.12 |
| 5,325,646 | A | * | 7/1994 | Hallsten et al. .............. 52/246 |
| 5,379,563 | A | * | 1/1995 | Tinsley ........................ 52/295 |
| 5,405,433 | A | * | 4/1995 | Rogers ........................ 95/187 |
| 5,421,861 | A | * | 6/1995 | Gohara et al. ................. 95/235 |
| 5,535,561 | A | * | 7/1996 | Schuyler .................. 52/223.13 |
| 5,562,377 | A | * | 10/1996 | Giannuzzi et al. ............. 411/82 |
| 5,662,304 | A | * | 9/1997 | McDaniel ................... 248/499 |
| 5,699,639 | A | * | 12/1997 | Fernandez .................... 52/707 |
| 5,761,863 | A | * | 6/1998 | Sutt et al. ..................... 52/272 |
| 5,950,376 | A | * | 9/1999 | Kemeny et al. ............ 52/167.1 |
| 5,974,747 | A | * | 11/1999 | Perry ........................... 52/270 |
| 5,979,130 | A | * | 11/1999 | Gregg et al. .................. 52/295 |
| 6,112,495 | A | * | 9/2000 | Gregg et al. .................. 52/712 |
| 6,250,041 | B1 | * | 6/2001 | Seccombe .................... 52/712 |
| 6,394,537 | B1 | * | 5/2002 | DeRees ....................... 296/191 |
| 6,460,308 | B1 | * | 10/2002 | Armstrong et al. ............ 52/698 |
| 6,572,118 | B2 | * | 6/2003 | Deeb et al. ................... 277/616 |
| 7,007,432 | B2 | * | 3/2006 | Commins .................. 52/293.3 |
| 2002/0002806 | A1 | * | 1/2002 | Commins et al. .......... 52/481.1 |
| 2002/0066247 | A1 | * | 6/2002 | Leek ........................... 52/295 |
| 2003/0196393 | A1 | * | 10/2003 | Bowman et al. .............. 52/295 |
| 2003/0205014 | A1 | * | 11/2003 | Schneider .................... 52/364 |
| 2004/0011200 | A1 | * | 1/2004 | Goode et al. .................. 95/199 |
| 2004/0083669 | A1 | * | 5/2004 | Hilburn .................. 52/396.04 |
| 2006/0016140 | A1 | * | 1/2006 | Smith .......................... 52/295 |
| 2006/0213136 | A1 | * | 9/2006 | Lin .............................. 52/295 |
| 2007/0062135 | A1 | * | 3/2007 | Mueller .................... 52/293.3 |
| 2007/0157542 | A1 | * | 7/2007 | Peterson ...................... 52/677 |
| 2007/0180780 | A1 | * | 8/2007 | Foglia ........................ 52/92.2 |
| 2007/0271861 | A1 | * | 11/2007 | Sugranes Arimany ...... 52/169.7 |
| 2008/0016894 | A1 | * | 1/2008 | Wiggs .......................... 62/260 |

FOREIGN PATENT DOCUMENTS

| | | | | |
|---|---|---|---|---|
| EP | 1865113 | A1 | * | 12/2007 |
| JP | 56041932 | A | * | 4/1981 |
| JP | 59185230 | A | * | 10/1984 |
| JP | 03087420 | A | * | 4/1991 |
| JP | 04155051 | A | * | 5/1992 |

* cited by examiner

ABSORBER TOWER METAL HOOD TO CONCRETE SHELL ATTACHMENT

FIELD AND BACKGROUND OF THE INVENTION

The present invention relates, in general, to wet flue gas desulfurization absorber towers, and more particularly, to an assembly for facilitating the attachment of a metal hood to a concrete shell of a spray absorber tower, and compensating for relative radial thermal expansion of the hood and the shell.

Sulfur oxides are produced in significant quantity by the combustion of coal or fuel oil, and the most common flue gas desulfurization process used with coal and oil-fired electrical generating power plants is known as "wet scrubbing." For purposes of removing sulfur dioxide from flue gases, the cleansing fluid is typically an alkaline slurry which is sprayed into the flue gas as it flows through the absorber tower. Wet flue gas desulfurization processes for removing sulfur dioxide from flue gases involve the use of calcium-based slurries, or sodium-based or ammonia-based solutions. In this process the sulfur dioxide-containing flue gas is scrubbed with the calcium-based alkaline slurry or slurry reagent which may also include any number of additives to enhance removal, control chemistry, and reduce chemical scale. The slurry reagent, when contacted by sulfur dioxide, results in the absorption of the sulfur dioxide by the slurry and forms sulfites which are collected in a reaction tank situated below or forming the bottom of the absorber tower. Thereafter, the slurry can be oxidized to cause the alkali to react with the absorbed sulfur dioxide to yield a useful product. For example, in the case of desulfurization where a calcium-based alkaline slurry is used to absorb sulfur dioxide, an oxygen containing gas such as air is injected into the slurry to oxidize the aqueous sulfite into sulfate; the latter will then react with calcium ions in the slurry to form gypsum, a marketable product. It should be noted that the above reaction is exemplary, and that the teachings of this invention are not limited to the use of calcium-based slurries in a desulfurization reaction.

The technology for wet scrubbing provides gas-liquid contact in a number of differently configured systems. In recent years, wet flue gas desulfurization of the type commonly referred to as the in-situ forced oxidation type have been the preferred systems for achieving oxidation. These systems comprise two major components: the spray absorber in which the actual flue gas scrubbing takes place, and the reaction tank to allow for efficient utilization of the reagent. The absorber tower is fitted with a hood which forms the roof of the tower and defines the flue gas outlet opening from the tower. The majority of such systems are single loop systems in which the absorber and the reaction tank are combined to form a single structure. Some oxidation of sulfite to sulfate inevitably occurs in the gas-liquid contact zone of the absorber, and is referred to as natural oxidation so as to distinguish it from forced oxidation in which air is sparged through the slurry in the reaction tank. The sulfites must be oxidized to sulfates in order to maintain the reaction tank generally free of scale.

Due to chemical attack and the corrosive nature of the flue gas desulfurization slurries, the spray absorber tower has traditionally been constructed of either expensive corrosion resistant metal alloys or of carbon steel which is relatively inexpensive but susceptible to corrosion and chemical attack without the use of a corrosion resistant inner liner. Liners are usually made of rubber, fiberglass, or wall paper alloys to protect the carbon steel from the corrosive action of the chemicals inside the spray absorber and reaction tank. Traditionally, the tower shell and hood have been constructed of the same metal alloy. The absorber tower and the hood experience nearly the same temperature, due to the relatively high thermal conductivity of the typical metal alloys used in their fabrication, thus allowing the hood to be welded directly to the tower shell. The welding of the hood directly to the tower shell forms an integral structure with negligible differential thermal expansion occurring within the hood and tower structure itself. The hood-to-tower shell weld insures a gas tight seal at that junction.

Advancing technology has led to larger size absorber towers, with towers measuring approximately 60 feet in diameter currently in use. The present invention provides a cost-effective alternative to these large diameter metal towers, by fabricating the shell portion of the spray absorber tower from concrete, with an inner wall lining of corrosion resistant protective tiles. On the hand, it has been determined that hoods made of concrete for large diameter absorber towers are not cost-effective, so that it is desirable to make the hood from a corrosion resistant metal alloy. However, because of the difference in thermal expansion characteristics between the metal hood and the concrete shell, there is a need to provide an attachment assembly which will accommodate the relative radial thermal expansion of the metal alloy hood and the corrosion resistant concrete tower.

SUMMARY OF THE INVENTION

This difficulty is overcome through the practice of the present invention which provides an assembly and method for facilitating the attachment of the metal alloy hood to the concrete shell of the spray absorber tower, and compensating for relative radial thermal expansion of the hood and the shell during start up, shut down, and operation of the spray absorber tower, while also providing accurate and effective distribution of shear forces circumferentially along a horizontal plane from the metal hood to anchor rods partially embedded in the concrete shell of the spray absorber tower.

The assembly is generally comprised of a ring like shoulder plate affixed to the bottom periphery of the corrosion resistant metal alloy hood. A plurality of circumferentially equispaced anchor rods is partially embedded in the top of the concrete of the spray absorber tower and extends upwardly therefrom. The shoulder plate is perforated with a corresponding plurality of anchor rod engaging bores, wherein each of the bores has a cross sectional area which is greater than the cross sectional area of the anchor rod engaged therewith, so as to facilitate the positioning, lowering, and seating of the metal alloy hood onto the top of the concrete shell. Each of the bores is configured with an ellipsoidal cross section. After the seating of the metal alloy hood onto the top of the concrete shell with each of the bores engaging a corresponding anchor rod, a pipe sleeve of circular cross section is mounted over each anchor rod and is extended into the bore to rest against the upper surface of the concrete shell. The outer diameter of the circular pipe sleeve is substantially equal in length to the minor axis of the ellipsoidal configured bore so that the sleeve is in contact with the shoulder plate at the intersection of the minor axis and the wall of the sleeve. The annular space formed between the circular pipe sleeve and the anchor rod is filled with non-shrink grout to provide an accurate and effective distribution of shear forces circumferentially along a horizontal plane from the metal alloy hood to each of the anchor rods. Gaps or slots are formed along the major axis of the ellipsoidal configured bore between the inner surface of the bore and the outer surface of the circular pipe sleeve to accommodate the relative radial thermal expansion of the metal alloy hood and the concrete shell. A flexible, non-metallic sleeve is mounted to adjacent end portions of the metal alloy hood and the concrete shell to provide a gas-liquid tight seal at the juncture of the hood and shell. The concrete shell is preferably furnished with a protective lining which may consist of tiles.

A relatively thick elastomeric bearing pad provided with holes to fit over the pipe sleeves and anchor rods is mounted between the metal alloy hood shoulder plate and the top of the concrete shell to protect the abutting metal and concrete surfaces from wear and gouging and to provide uniform circumferential distribution of loads at the hood-to-shell juncture. The elastomeric bearing pad accommodates motion by deformation of the bearing pad itself, without sliding between surfaces. The tensioning of the anchor rods compresses the elastomeric bearing pad which enables the bearing pad to make close contact with the underside shoulder plate and the top of the concrete shell, thereby distributing the load more evenly. A pair of gusset plates is mounted on the shoulder plate and straddle a corresponding anchor rod and pipe sleeve. A cap is engagedly mounted on each anchor rod above the pair of gusset plates, and a sliding pad is engagedly mounted on each anchor rod between the cap and the corresponding pair of gusset plates. The sliding pad is attached to the underside of the cap to accommodate the movement resulting from the relative radial thermal expansion of the metal alloy hood and the concrete shell. Each of the anchor rods is preloaded and a washer, a nut, and a jam nut engage the anchor rod to secure the metal alloy hood to the concrete shell of the spray absorber tower, as shown in FIG. 1.

These and other features and advantages of the present invention will be better understood and its advantages will be more readily appreciated from the detailed description of the preferred embodiment, especially when read with reference to the accompanying drawings.

DESCRIPTION OF THE PREFERRED EMBODIMENT

Figure 1:
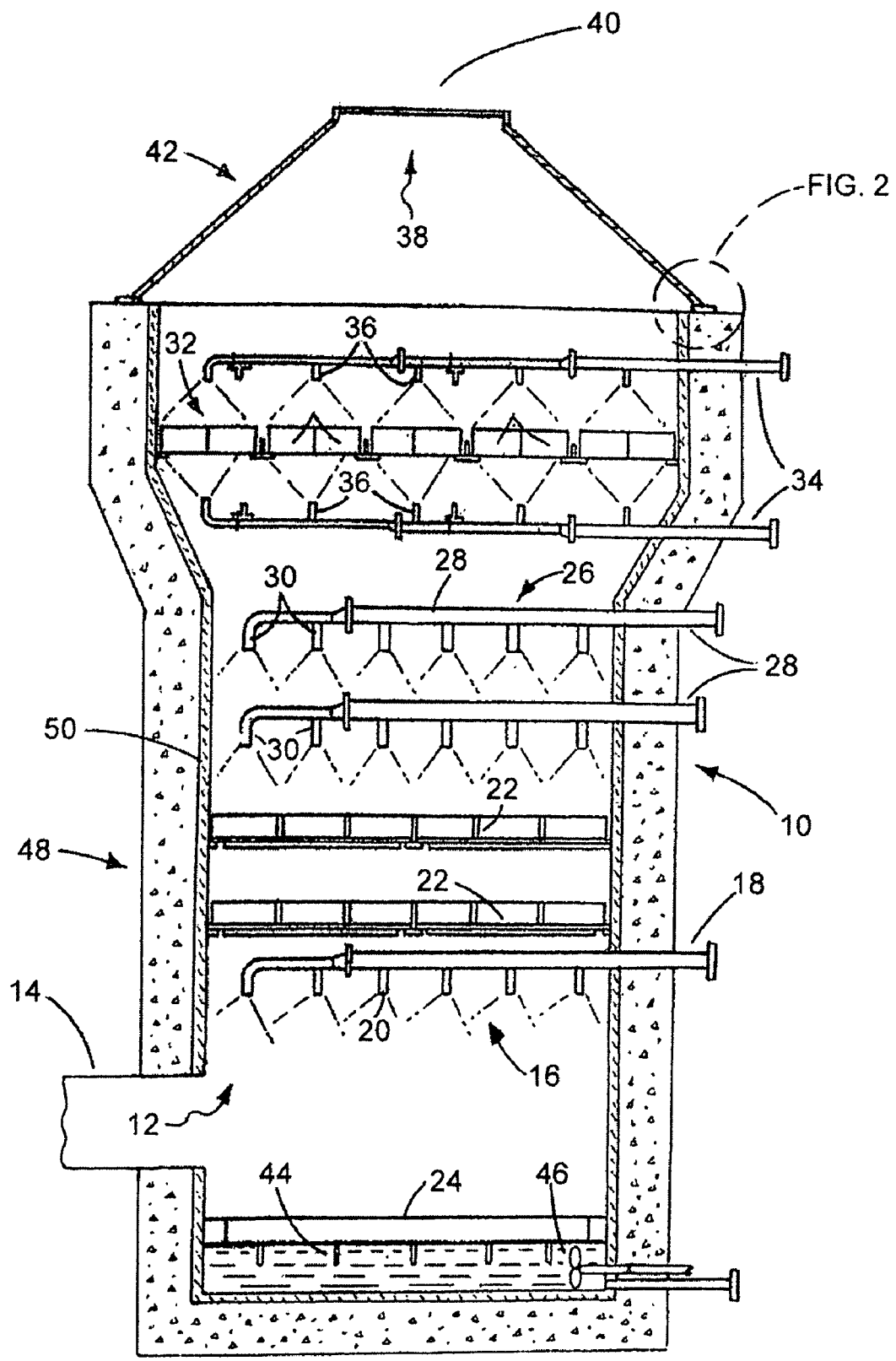
FIG. 1 is a schematic sectional side view of a spray absorber tower which incorporates the present invention.

The present invention has preferred application to utility boiler flue gases, however, it is not limited to the illustrated embodiments, and effluents from all types of combustion sources, utilizing packed or other types of scrubbing assembly, a wide range of reagents in co-current and/or counter-current applications, multiple reaction tanks per absorber, baffling and distribution equipment and side entering reaction tank agitators are envisioned. It is to be understood that, in these embodiments, the dimensions, shapes and relative arrangements of the various components are given solely to illustrate the present invention and not to limit the scope thereof.

Reference will hereinafter be made to the accompanying drawings wherein like reference numerals throughout the various figures denote like elements.

Referring to FIG. 1, there is shown a spray absorber tower at 10 wherein untreated flue gas 12 is introduced through a flue gas inlet 14 located at the lower end of the spray absorber tower 10 and is caused to flow upwardly and to pass through a quenching zone 16 which is comprised of a plurality of manifolds 18 and spray nozzles 20. An alkaline slurry reagent is supplied to the spray nozzles 20 through manifolds 18. As it flows upwardly through the quenching zone 16, the flue gas 12 passes through the perforated trays 22 which promote gas-liquid contact with the absorbent slurry that is draining back to the reaction tank or sump 24. The now partially treated flue gas 12 continues in its upward flow and passes through a spray zone 26 which is comprised of a plurality of manifolds 28 and spray nozzles 30, and where it comes into gas-liquid contact with additional absorbent slurry that is being injected from nozzles 30. The absorbent slurry absorbs sulfur dioxide still present in the partially treated flue gas. The treated flue gas continues its upward flow through the droplet removal devices 32, such as known nested chevron demisters or mist eliminators, to minimize liquid discharge to the atmosphere. Manifolds 34 deliver wash fluid to the spray nozzles 36 to clean the inlet and outlet surfaces of the droplet removal device 32. The treated or scrubbed flue gas 38 leaves the mist eliminator 32 and exits from the spray absorber tower 10 through the gas outlet 40 formed at the top of the hood 42. The slurry, contained within the reaction tank 24, is aerated by the spargers 44 and is stirred by motor-driven agitator bars 46, and thence returned to the spray nozzles 20 and 30 to continue the flue gas desulfurization process. Limestone feed slurry from a storage tank, not shown, is fed into the reaction tank 24 through a conduit so as to maintain a relatively constant and stable composition of absorbent slurry in the reaction tank 24.

The spray absorber tower 10 is formed of a concrete shell 48 and, preferably, with an inner protective lining 50 of corrosion resistant material. The hood 42 is made of a corrosion resistant metal alloy, since it has been determined that it is not cost-effective for larger size absorber towers to be equipped with hoods made of concrete. The present invention provides an arrangement for accommodating the differential thermal expansion between the concrete shell 48 and the metal alloy hood 42 forming the spray absorber tower 10.

A metal hood 42 for a large spray absorber 10 is itself generally too large to be conveniently or cost-effectively shipped in an assembled form from the place of manufacture to the site of the spray absorber tower 10. Therefore, it is preferable to assemble the metal hood 42 on site. A crane is used to lift, position, lower, and seat the assembled hood down onto the top of the concrete shell 48 of the spray absorber tower 10.

Figure 2:
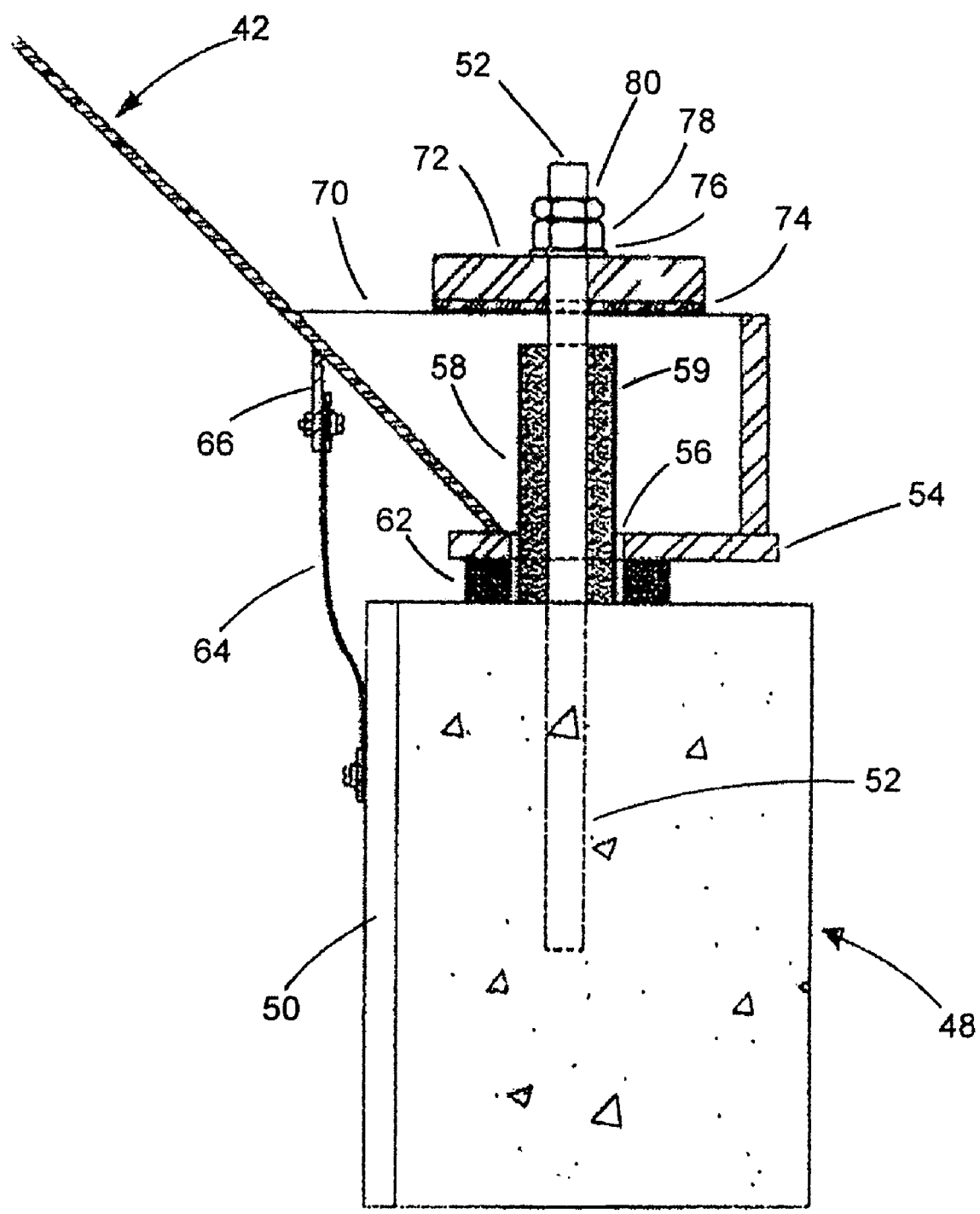
FIG. 2 is a schematic detail sectional side view of the attachment area of the metal alloy hood to the concrete shell of the spray absorber tower shown in FIG. 1.
Figure 3:
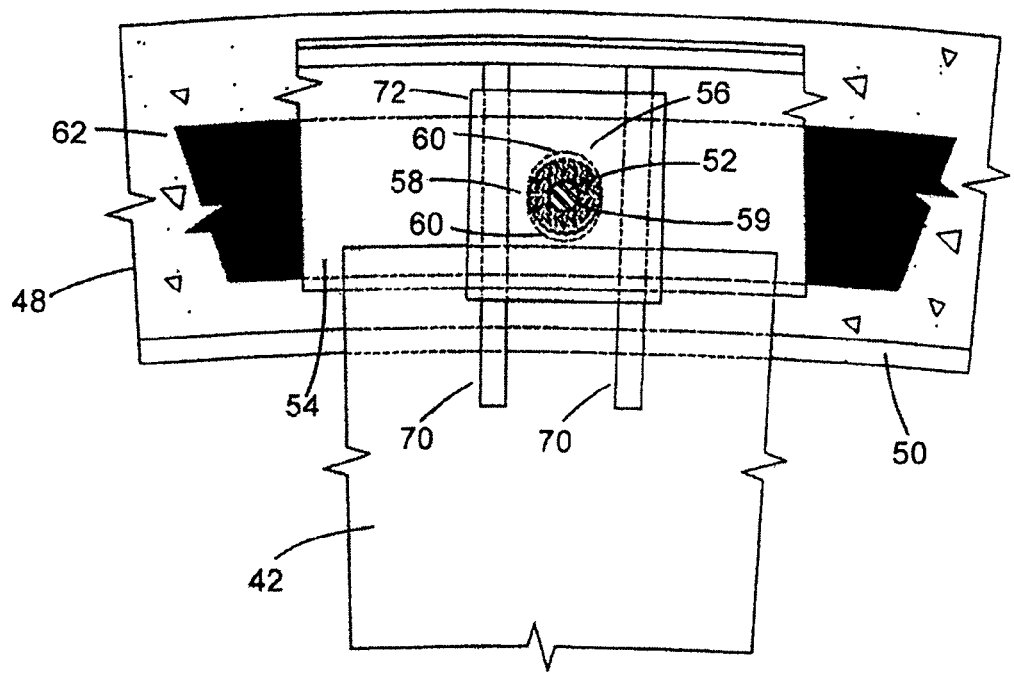
FIG. 3 is a schematic plan view at the anchor rod with the washer, the nut, and the jam nut not shown.
Figure 4:
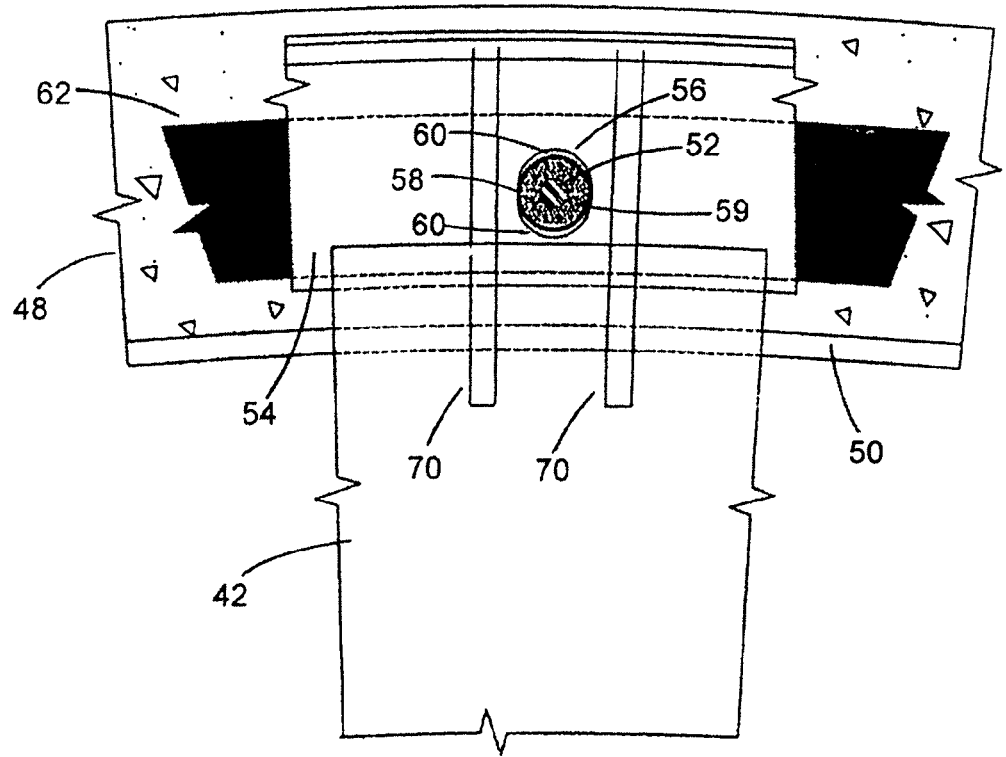
FIG. 4 is a schematic plan view at the anchor rod with the washer, the nut, the jam nut, and cap not shown.

Turning now to FIG. 2, there is shown a detail of the area dealing with the assembly for attaching the metal hood 42 to the concrete shell 48. A plurality of anchor rods 52, one of which is shown in FIGS. 2, 3 and 4, have their lower ends embedded in the concrete shell 48 and their upper ends extending upwardly therefrom. The anchor rods 52 restrain the metal hood 42 against both tension and shear loadings. The metal hood 42 is preferably made from a corrosion resistant alloy, and is formed or affixed with a shoulder ring-like member or plate 54 extending outwardly from and along its lower or bottom periphery. The shoulder plate 54 is perforated with a plurality of anchor rod engaging bores 56, each of which has a cross sectional area that is greater than the cross sectional area of the anchor rod 52 engaged therewith. The oversize bores 56 insure that the metal hood 42 can be easily guided and seated down over the anchor rods 52 and onto the top of the concrete shell 48, while also accommodating the relative radial expansion of the metal hood 42 and the concrete shell 48 during start up, shut down, and operation of the spray absorber tower 10, shown in FIG. 1.

Referring to FIGS. 2, 3 and 4 and in accordance with the present invention, each of the bores 56 is configured with an oval or ellipsoidal cross section as shown in FIGS. 3 and 4. After the metal hood 42 is positioned in place and resting on top of the concrete shell 48, a pipe sleeve 58 of circular cross section is fitted around each anchor rod 52. The pipe sleeve 58 has a diameter which is equal in length to the minor axis of the bore, thus increasing the effective diameter of the anchor rod 52 while reducing the gap or peripheral space between the bore 56 and the anchor rod 52, engaged therewith, to that formed by the slots 60, shown in FIGS. 3 and 4, lying along the major axis of the bore 56 between the outer surface of the circular pipe sleeve 58 and the inner surface of the ellipsoidal bore 56 so as to accommodate movement resulting from the radial thermal expansion of the metal hood 42 and the concrete shell 48. The annulus formed between the inner surface of the pipe sleeve 58 and the outer surface of the anchor rod 52 is filled with non-shrink grout 59 to provide an accurate and effective distribution of shear forces circumferentially along a horizontal plane from the metal hood 42 to each of the anchor rods 52.

In order to accommodate variations in flatness between the abutting surfaces of the shoulder plate 54 and the concrete shell 48, and to prevent wear or gouging which could result from sliding between the shoulder plate 54 and the concrete shell 48, as well as non-uniform distribution of loads around the circumference of the hood-to-shell junction, an elastomeric bearing pad 62 with holes to fit over the pipe sleeves 58 is inserted between the shoulder plate 54 and the concrete shell 48. The elastomeric bearing pad 62 accommodates motion between the shoulder plate 54 and the concrete shell 48 through deformation of the pad 62 itself, without sliding between the abutting surfaces. The tensioning of the anchor rods 52 compresses the elastomeric bearing pad 62 which enables the pad 62 to make close contact with the shoulder plate 54 and the top surface of the concrete shell 48, thereby achieving a more uniform distribution of load.

A flexible non-metallic sleeve 64, shown in FIG. 2, is mounted to adjacent end portions of the metal hood 42 and the concrete shell 48 to provide a gas-liquid tight seal at the hood-to-shell joint. The flexible sleeve 64 has its upper peripheral end bolted to a drip plate 66, the latter being welded to the inside surface of the metal hood 42. The lower peripheral end of the flexible sleeve 64 is bolted to the protective lining 50 covering the inside surface of the concrete shell 48 or, where a lining is not provided, to the shell 48 itself. The protective lining 50 may be in the form of tiles, not shown.

Referring to FIGS. 2, 3 and 4, there are shown a pair of gusset plates 70 straddling each anchor rod 52 and corresponding pipe sleeve 58. The gusset plates 70 are mounted on the topside of the shoulder plate, preferably by their being welded thereto. A perforated cap 72 is engagedly mounted on each anchor rod 52 above the corresponding gusset plates 70, and a perforated sliding pad 74, shown in FIG. 2, is engagedly mounted on each anchor rod 52 between the cap 72 and the corresponding pair of gusset plates 70. The sliding pad 74 is attached to the underside of the cap 72 and rests on top of the gusset plates 70. Accordingly, the abutting surfaces of the sliding pad 74 and the gusset plates 70 slidably accommodate the movement resulting from the relative radial thermal expansion of the metal hood 42 and the concrete shell 48. Each of the anchor rods 52 is preloaded and a washer 76, a nut 78, and a jam nut 80 threadably engage the anchor rod 52 to secure the metal alloy hood 42 to the concrete shell 48 of the spray absorber tower 10, shown in FIG. 1.

Although the present invention has been described above with reference to particular means, materials, and embodiments, it is to be understood that this invention may be varied in many ways without departing from the spirit and scope thereof, and therefore is not limited to these disclosed particulars but extends instead to all equivalents within the scope of the following claims.

We claim:

1. An assembly for facilitating the attachment of a metal hood to a concrete shell and compensating for relative radial thermal expansion of the hood and the shell, comprising:
   a shoulder plate affixed to the bottom of the hood;
   an elastomeric bearing pad located between the shoulder plate and the shell;
   a plurality of anchor rods having a top end extending upwardly from the concrete shell and a bottom end extending through the shoulder plate and partially embedded in the concrete shell;
   a corresponding plurality of rod-engaging bores perforating the shoulder plate, each of the bores having a cross sectional area greater than the cross sectional area of the rod engaged therewith;
   a pipe sleeve of circular cross section fitted around each anchor rod and extending through the bores of the shoulder plate;
   a plurality of gusset plate pairs mounted on the top of the shoulder plate, wherein each anchor rod is straddled by a pair of gusset plates; and a perforated cap mounted directly on top, and thus in contact with the pair of gusset plates, wherein the anchor rod passes though the perforated cap and a nut threadably engaged to the anchor rod above the perforated cap secures the metal hood to the concrete shell.

2. The assembly according to claim 1 wherein the metal hood is made of a corrosion resistant alloy.

3. The assembly according to claim 1 wherein each of the bores has an ellipsoidal cross section.

4. The assembly according to claim 1 including a flexible sleeve extending from the underside of the hood to the concrete shell for maintaining substantial gas-liquid tight attachment between the metal hood and concrete shell.

5. The assembly according to claim 4 wherein the flexible sleeve is non-metallic.

6. The assembly according to claim 1 wherein the concrete shell has a protective lining.

7. The assembly according to claim 1 wherein the concrete shell is lined with tiles.

8. The assembly according to claim 5 wherein a perforated sliding pad is engagedly mounted on each anchor rod between the cap and the corresponding pair of gusset plates.

9. The assembly according to claim 8 wherein the sliding pad is attached to the underside of the cap.

10. The assembly according to claim 9 wherein a peripheral space between the pipe sleeve and the anchor rod is filled with non-shrink grout.

11. The assembly according to claim 9 wherein the pipe sleeve has a circular cross section.

12. The assembly according to claim 11 wherein the bore has an ellipsoidal cross section.

13. The assembly according to claim 12 wherein the outer diameter of the pipe sleeve is substantially equal in length to the minor axis of the bore.

14. The assembly according to claim 13 including slots formed along the major axis of the ellipsoidal bore between the inner surface of the bore and the outer surface of the circular pipe sleeve to accommodate the relative radial thermal expansion of the metal hood and the concrete shell.

* * * * *